United States Patent

[11] 3,581,162

[72] Inventor William Richard Wheatley
Somerville, N.J.

[21] Appl. No. 838,198
[22] Filed July 1, 1969
[45] Patented May 25, 1971
[73] Assignee RCA Corporation

[54] OPTICAL SEMICONDUCTOR DEVICE
8 Claims, 2 Drawing Figs.

[52] U.S. Cl. .......... 317/234, 317/235, 250/211, 250/216, 250/217, 250/220, 250/239
[51] Int. Cl. .......... H01l 1/12, H01l 9/06
[50] Field of Search .......... 317/234, 231, 4, 4.1, 5, 5.4, 27; 250/216, 217, 220, 239, 211 J, 217 SLS; 313/108 D; 315/169, 169 TV

[56] References Cited

UNITED STATES PATENTS

| | | | |
|---|---|---|---|
| 3,359,507 | 12/1967 | Hall .......... | 331/94.5 |
| 3,366,793 | 1/1968 | Svedberg .......... | 250/211 |
| 3,430,054 | 2/1969 | Klein .......... | 250/217 |
| 3,474,358 | 10/1969 | Geddry et al. .......... | 333/7 |
| 3,484,713 | 12/1969 | Fenner .......... | 331/94.5 |

*Primary Examiner*—John W. Huckert
*Assistant Examiner*—R. F. Polissack
*Attorney*—Glenn H. Bruestle

ABSTRACT: An optical semiconductor device comprises a metal supporting member having a mounting stem, a flat head on one end of the stem and a hub on the head. The hub has an end surface and a peripheral surface. A plurality of electroluminescent semiconductor diodes are mounted in spaced relation on the peripheral surface of the hub so that the supporting member is one terminal of each of the diodes. A terminal wire extends through and is insulatingly supported on the head of the supporting member. The terminal wire is electrically connected to each of the diodes so as to be the other terminal of the diodes. The diodes are all positioned so that they are adapted to emit light in the same direction away from the head of the supporting member. An additional electroluminescent semiconductor diode may be mounted on the end surface of the hub and electrically connected to the supporting member and the terminal wire. The additional diode is also adapted to emit light in the same direction as the other diodes.

PATENTED MAY 25 1971 3,581,162

INVENTOR.
William R. Wheatley
BY
Donald S. Cohen

OPTICAL SEMICONDUCTOR DEVICE

BACKGROUND OF THE INVENTION

This invention relates to an optical semiconductor device, and more particularly to an optical semiconductor device having increased power output.

Light emitting semiconductor elements are the kind which exhibit electroluminescence in the vicinity of a PN junction which is biased so as to inject charge carriers of one type into a region where the predominant charge carriers are of the opposite type. Light is emitted in conjunction with the recombination of pairs of oppositely charged carriers.

Although such light-emitting semiconductor elements have many advantages, such as smallness in size, greater ruggedness, low cost, and easy modulation capability, they have the disadvantage of being relative low-power output devices. Proposals have been made to increase the power output of these elements by providing an array of the elements connected for simultaneous operation. However, for such an array of the light-emitting elements consideration must be given to maintaining the assembly of the array as small as possible and, for many uses of the device of being able to control the size and the shape of the beam of light emitted from the array. Also, it is desirable that the assembly be capable of being mounted for ease of alignment with reference to the target for the light emitted from the device.

SUMMARY OF THE INVENTION

The invention provides an optical semiconductor device comprising a metal supporting member having a peripheral surface and an end surface. A plurality of active electroluminescent semiconductor elements are mounted in spaced relation on the peripheral surface of the supporting member. Each of the elements has adjacent P-type and N-type regions with a light-emitting PN junction therebetween. One of the regions of each of the elements is electrically connected to the peripheral surface of the supporting member and the PN junction of each of the elements extends to a surface of the element which faces in the same direction as the end surface of the supporting member so as to emit light from the said surface of the element. A terminal wire is carried by the supporting member and is electrically connected to the other region of each of the elements.

DETAILED DESCRIPTION

Figure 1:
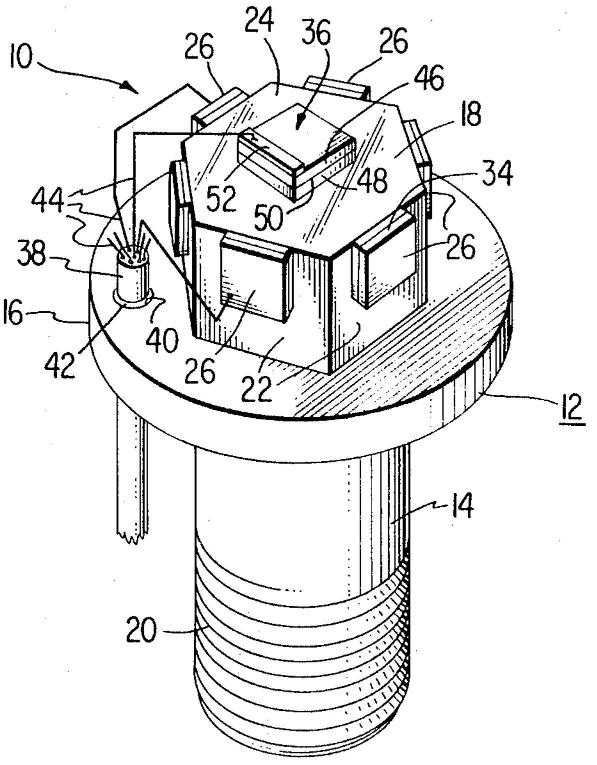
FIG. 1 is a perspective view of one embodiment of the optical semiconductor device of the present invention.
Figure 2:
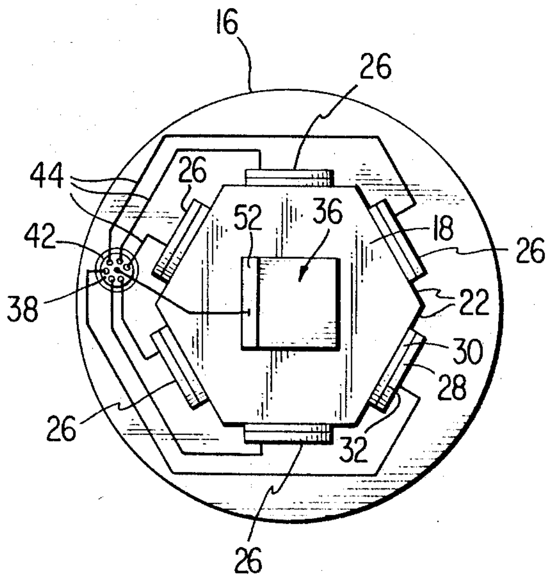
FIG. 2 is a top plan view of the optical semiconductor device of FIG. 1.

Referring to the drawing, the embodiment of the optical semiconductor device of the present invention shown therein is generally designated as 10. The device 10 includes a supporting member, generally designated as 12, of an electrically conductive metal, such as cold rolled steel which may be coated with thin protective films of nickel and gold. The supporting member 12 comprises a cylindrical stem 14, a flat circular head 16 on one end of the stem and a hub 18 on the head. The outer surface of the stem 14 is provided with a helical thread 20 to permit the device 10 to be secured to a panel or the like. As shown, the hub 18 has a polyhedral peripheral surface so as to provide a plurality of flat faces 22, and a flat end surface 24. Preferably, the longitudinal axis of the hub 18 is in alignment with the longitudinal axis of the stem 14.

A separate electroluminescent semiconductor element 26 is mounted on each face 22 of the peripheral surface of the hub 18. The electroluminescent semiconductor elements 26 may be of any construction well known in the art. However, in general, each of the elements 26 has adjacent P-type and N-type regions, 28 and 30 respectively, with a PN junction 32 therebetween which extends to a light-emitting end surface 34 of the element. The outer side surfaces of the P-type region 28 and the N-type region 30 are coated with metal films, not shown, which provide ohmic contacts to the regions and permit soldering thereto. Each of the elements 26 is secured at its N-type side surface to its respective flat face 22 of the peripheral surfaces of the hub 18 by a suitable solder, such as a 99 percent tin and 1 percent bismuth solder, to provide an ohmic joint of good electrical and thermal conductivity. The elements 26 are positioned on the respective flat faces 22 with the light-emitting end surface 34 being adjacent to and facing in the same direction as the end surface 24 of the hub 18.

An additional electroluminescent semiconductor element 36 may be mounted on the end surface of the hub 18. The additional element 36 has adjacent P-type and N-type regions 46 and 48 with a PN junction 50 therebetween. The side surface of the N-type region 48 is coated with a metal film, not shown, which provides ohmic contact to the region and permits soldering thereto. The side surface of the P-type region 46 is coated with a narrow metal film 52 which provides ohmic contact to the region and permits soldering thereto. However, the major portion of the side surface of the P-type region is uncovered so that light generated at the PN junction 50 will be emitted through this side surface. The additional element 36 is secured to the end surface 24 of the hub 18 with the N-type region 48 being electrically connected to the end surface and with the light-emitting side surface of the P-type region 46 facing away from the end surface 24 of the hub 18. Thus, the light-emitting surfaces of all the electroluminescent semiconductor elements 26 and 36 all face in the same direction.

A terminal wire 38 of an electrically conductive metal, such as a nickel-iron composition known as 052 metal which may be coated with thin protective films of nickel and gold, extends through a hole 40 in the head 16 of the supporting member 12. The terminal wire 38 is mechanically secured to and electrically insulated from the head 16 by a ring 42 of an electrically insulating material, such as a glass or ceramic. The insulating ring 42 fills the space in the hole 40 between the terminal wire 38 and the head 16 and is fused to the terminal wire and the head. The terminal wire 38 is electrically connected to each of the electroluminescent semiconductor elements 26 and 36 by a separate fine wire 44, approximately 2 mils thick, of an electrically conductive metal, such as gold. Each of the fine wires 44 is soldered at one end to the terminal wire 36 and at its other end to the metal coating on the P-type region of its respective element.

In the use of the optical semiconductor device 10, when a current of a threshold value is applied to the electroluminescent semiconductor elements 26 and 36 so that the current travels in a direction in which the elements are forward biased, beams of light are emitted from the light-emitting surfaces of the element. The term "light" as used herein means electrolmagnetic radiation in either the visible and/or invisible regions of the electrolmagnetic spectrum. Since the light-emitting surfaces of the elements all face in the same direction, the individual beams of light provide a composite beam of an intensity equal to the sum of the intensities of the individual beams. The beams of light emitted from the elements 26 on the peripheral surface of the hub 18 provide a substantially cylindrical composite beam and the light emitted from the element 36 on the end surface of the hub fills in the area bounded by the other beams. Thus the magnitude of the output of the optical semiconductor device 10 and the shape and size of the light beam emitted therefrom depends on the number and arrangements of the electroluminescent semiconductor elements on the hub of the supporting member.

Although the peripheral surface of the hub 18 of the supporting member 12 is shown in FIG. 1 as having six flat faces, the peripheral surface can have any desired number of flat faces, depending on the magnitude of the output and the size and shape of these emitted beam desired. Also, if the electroluminescent semiconductor elements on the peripheral surface of the hub provide a composite beam of light which is suitable for a desired use of the optical semiconductor device, the element on the end surface of the hub can be eliminated. In addition, although it is preferred to have the peripheral surface of the hub of polyhedral shape to permit greater case of mounting the electroluminescent semiconductor elements on the flat faces, if the elements are small enough the peripheral surface of the hub can be of a cylindrically curved shape. Although each of the electroluminescent semiconductor elements mounted on the peripheral surface of the hub is shown as a single element having a single light-emitting junction, each of the elements can be a stack of two or more semiconductor elements electrically connected in series and providing a plurality of light-emitting junctions.

Another advantage of the optical semiconductor device 10 is that it can be easily mounted on a panel or chassis with good reference with regard to the target for the light emitted therefrom. Since the electroluminescent semiconductor elements are mounted on the hub uniformally around the longitudinal axis of the hub which is also the longitudinal axis of the stem, the longitudinal axis of the composite beam of light emitted from the optical semiconductor device also extends along the longitudinal axis of the stem. Thus, by properly positioning the hole in the mounting panel or chassis into which the stem is inserted, when the device is mounted on the panel or chassis the beam of light emitted from the device will be automatically aligned with the target. The ability to mount the device 10 with good reference is particularly important when mounting an array of a plurality of the devices on a single panel or chassis.

I claim:

1. An optical semiconductor device comprising
   a. a metal supporting member having a peripheral surface and an end surface, said peripheral surface having a plurality of flat portions;
   b. a plurality of active electroluminescent semiconductor elements mounted in spaced relation on said peripheral surface, with each element being on a separate flat portion of said peripheral surface said elements having adjacent P-type and N-type regions with a light-emitting PN junction therebetween, one of said regions being electrically connected to said peripheral surface and said junction extending to a surface of the element which faces in the same direction as the end surface of the supporting member so as to emit light from said surface of the element;
   c. a terminal wire carried by said supporting member; and
   d. means electrically connecting said terminal wire to the other region of each of said elements.

2. An optical semiconductor device in accordance with claim 1 in which the peripheral surface of the supporting member is polyhedral and each of the elements is mounted on a separate face of the peripheral surface.

3. An optical semiconductor device in accordance with claim 2 including a separate active electroluminescent semiconductor element on each of the faces of the peripheral surface.

4. An optical semiconductor device in accordance with claim 3 including an additional active electroluminescent semiconductor element mounted on the end surface of the supporting member, said additional element having adjacent P-type and N-type regions with a light-emitting PN junction therebetween, one of said regions being electrically connected to said end surface, and means electrically connecting the terminal wire to the other region of said additional element.

5. An optical semiconductor device in accordance with claim 3 in which the supporting member includes a mounting stem, a flat head on one end of the stem and a hub on the head, said hub having the end surface and the peripheral surface on which the elements are mounted.

6. An optical semiconductor device in accordance with claim 5 in which the terminal wire extends through the head of the supporting member and is insulatingly supported on said head.

7. An optical semiconductor device in accordance with claim 6 in which the means electrically connecting the terminal wire to each of the elements comprises a separate wire electrically connected at one end to the terminal wire and at the other end to a respective one of the elements.

8. An optical semiconductor device in accordance with claim 5 in which the longitudinal axis of the hub is in alignment with the longitudinal axis of the stem.